United States Patent
Brodziak et al.

(10) Patent No.: US 9,684,690 B2
(45) Date of Patent: Jun. 20, 2017

(54) FLIGHTS SEARCH

(75) Inventors: Marcin Z. Brodziak, Zurich (CH);
Emmet J. Connolly, Zurich (CH);
Alejandro Diaz, San Francisco, CA
(US); **Emmanuel Francois-David
Pellereau, Benglen (CH); Stefan H.
Pharies, Zurich (CH); Jiri Semecky**,
Adliswil (CH); Petter Wedum, Zurich
(CH)

(73) Assignee: GOOGLE INC., Mountain View, CA (US)

( * ) Notice: Subject to any disclaimer, the term of this patent is extended or adjusted under 35 U.S.C. 154(b) by 191 days.

(21) Appl. No.: 13/979,638

(22) PCT Filed: Jan. 12, 2012

(86) PCT No.: PCT/FR2012/050084
§ 371 (c)(1),
(2), (4) Date: Oct. 24, 2013

(87) PCT Pub. No.: WO2012/095613
PCT Pub. Date: Jul. 19, 2012

(65) Prior Publication Data
US 2014/0052714 A1    Feb. 20, 2014

Related U.S. Application Data

(60) Provisional application No. 61/432,158, filed on Jan. 12, 2011, provisional application No. 61/532,030, filed on Sep. 7, 2011.

(51) Int. Cl.
*G06F 17/30* (2006.01)
*G06Q 10/02* (2012.01)

(52) U.S. Cl.
CPC ....... *G06F 17/30424* (2013.01); *G06Q 10/02* (2013.01)

(58) Field of Classification Search
CPC ........ G06F 17/30106; G06F 17/30126; G06F 17/30103; G06F 17/30112; G06F 17/3089;
(Continued)

(56) References Cited

U.S. PATENT DOCUMENTS 5,729,458 A    3/1998 Poppen
6,307,572 B1   10/2001 Demarcken et al.
(Continued)

FOREIGN PATENT DOCUMENTS

| WO | 01/33408 A2 | 5/2001 |
| WO | 2008/109257 A1 | 9/2008 |
| WO | 2012/095613 A1 | 7/2012 |

OTHER PUBLICATIONS

International Search Report for PCT Application No. PCT/FR2012/050084, Dated Apr. 10, 2012.
(Continued)

*Primary Examiner* — Scott A Waldron
*Assistant Examiner* — Fatima Mina
(74) *Attorney, Agent, or Firm* — Johnson, Marcou & Isaacs, LLC

(57) ABSTRACT

Methods, systems, and apparatus, including computer programs encoded on a computer storage medium, for information retrieval. In one aspect, a method includes receiving a search query in a search interface; determining that the received search query is a flights-related query; and in response to determining that the search query is a flights-related query and without further user input, providing a flight search interface including a plurality of search dimensions and a plurality of flight search results, each dimension associated with an attribute of flight search and each dimension having an associated value, wherein one or more dimension values correspond to values extracted from the
(Continued)

search query, and wherein the plurality of flight search results are filtered according to the dimension values.

27 Claims, 13 Drawing Sheets

(58) Field of Classification Search
CPC ......... G06F 17/30867; G06F 17/30864; G06F 17/87; G06F 17/3092
See application file for complete search history.

(56) References Cited

U.S. PATENT DOCUMENTS

| | | | |
|---|---|---|---|
| 6,327,589 | B1 | 12/2001 | Blewett et al. |
| 6,826,472 | B1 | 11/2004 | Kamei et al. |
| 7,263,664 | B1 | 8/2007 | Daughtrey |
| 7,346,526 | B2 | 3/2008 | Daughtrey et al. |
| 7,840,426 | B2 | 11/2010 | Daughtrey et al. |
| 7,933,895 | B2 | 4/2011 | Amjadi |
| 7,996,419 | B2 | 8/2011 | Pfleger |
| 8,732,222 | B2 | 5/2014 | Horvitz et al. |
| 9,430,571 | B1 | 8/2016 | Carter et al. |
| 2002/0069118 | A1* | 6/2002 | Zylstra ............... G06Q 20/12 705/26.43 |
| 2003/0212737 | A1* | 11/2003 | Moricz ............. G06Q 30/0277 709/202 |
| 2004/0078251 | A1 | 4/2004 | DeMarcken |
| 2004/0078252 | A1* | 4/2004 | Daughtrey ........... G06Q 10/02 705/5 |
| 2004/0230451 | A1 | 11/2004 | Figa |
| 2004/0249682 | A1* | 12/2004 | DeMarcken ........ G06F 17/3048 705/5 |
| 2005/0226495 | A1* | 10/2005 | Li ....................... G06K 9/6284 382/159 |
| 2005/0228702 | A1 | 10/2005 | Fairbanks et al. |
| 2006/0129437 | A1* | 6/2006 | Lee .................... G06Q 10/02 705/5 |
| 2007/0106497 | A1 | 5/2007 | Ramsey et al. |
| 2007/0130124 | A1* | 6/2007 | Ramsey ............ G06F 17/30867 |
| 2007/0136144 | A1 | 6/2007 | Ephrati |
| 2007/0156469 | A1 | 7/2007 | Bird et al. |
| 2007/0198308 | A1* | 8/2007 | Crean et al. ..................... 705/5 |
| 2008/0033770 | A1 | 2/2008 | Barth et al. |
| 2008/0126080 | A1 | 5/2008 | Saldanha et al. |
| 2008/0167906 | A1 | 7/2008 | DeMarcken |
| 2008/0222119 | A1 | 9/2008 | Dai et al. |
| 2008/0222566 | A1 | 9/2008 | Daughtrey et al. |
| 2009/0119001 | A1 | 5/2009 | Moussaeiff et al. |
| 2009/0150343 | A1* | 6/2009 | English ............. G06Q 30/0603 |
| 2009/0192917 | A1 | 7/2009 | Wolkin |
| 2009/0216577 | A1 | 8/2009 | Killebrew |
| 2009/0271226 | A1 | 10/2009 | De Marcken |
| 2010/0185426 | A1* | 7/2010 | Ganesan ................ G08G 5/065 703/6 |
| 2011/0119593 | A1 | 5/2011 | Jacobson et al. |
| 2011/0125725 | A1 | 5/2011 | Daughtrey et al. |
| 2012/0265433 | A1 | 10/2012 | Viola et al. |
| 2013/0268517 | A1 | 10/2013 | Madhavan et al. |
| 2013/0344896 | A1 | 12/2013 | Kirmse et al. |
| 2016/0350433 | A1 | 12/2016 | Carter et al. |

OTHER PUBLICATIONS

Baharlou, "International Preliminary Report on Patentability issued in International Application No. PCT/FR2012/050084", mailed on Jul. 25, 2013, 7 pages.
Finkelstein, et al., "Placing Search in Context: The Concept Revisited", WWW10, May 1-5, 2001, 9 pages.
Fiorenzo, "European Office Action issued in European Application No. 12705329.6 mailed on Aug. 7, 2015", 7 pages.
Tallman, "U.S. Office Action issued in copending U.S. Appl. No. 13/688,085, filed Nov. 28, 2012", mailed Mar. 6, 2015, 16 pages.
Tallman, "U.S. Office Action issued in copending U.S. Appl. No. 13/688,085, filed Nov. 28, 2012", mailed Sep. 1, 2015, 20 pages.
Tran, "U.S. Office Action issued in copending U.S. Appl. No. 13/659,838, filed Oct. 24, 2012", mailed Jul. 2, 2014, 22 pages.
Tran, "U.S. Office Action issued in copending U.S. Appl. No. 13/659,838, filed Oct. 24, 2012", mailed Dec. 12, 2014, 25 pages.
Tran, "U.S. Office Action issued in copending U.S. Appl. No. 13/659,838, filed Oct. 24, 2012", mailed Jun. 29, 2015, 25 pages.
Tran, "U.S. Office Action issued in copending U.S. Appl. No. 13/659,838, filed Oct. 24, 2012", mailed Dec. 22, 2015, 26 pages.
U.S. Appl. No. 13/659,838 to Carter et al., filed Oct. 24, 2012.
Tallman, "U.S. Office Action issued in copending U.S. Appl. No. 13/688,085, filed Nov. 28, 2012", mailed on Aug. 9, 2016, 16 pages.
Tallman, "U.S. Office Action issued in copending U.S. Appl. No. 13/688,085, filed Nov. 28, 2012", mailed on Nov. 22, 2016, 23 pages.
U.S. Appl. No. 13/688,085 to Ben-Haim et al., filed Nov. 28, 2012.

* cited by examiner

| flights | Search | 1104 ⤵ |

Everything
Flights

Any number of stops
0 stops (direct)
1 stop

Any airline
Specific airlines...

Any connection
Only via...

Any outbound time
Custom time...

Any return time
Custom time...

↙ 1114

1. Route    From: San Francisco (SFO)    To: Saint Louis (STL)
2. Date     Depart: Tue July 12           Return: Sat July 16         ⤶ 1112
3. Limits   Price: Under $812 (auto)      Duration: Under 6h 00m (auto)
                                          ↖ 1116              ↖ 1118   ⤶ 1106

Outbound flight  San Francisco to Saint Louis

| Takeoff ▾ | Dur. | Arrival | Airline | Connections | Round trip |
|---|---|---|---|---|---|
| 6:00 am | 6h | 1:40 pm | American | via Dallas | 2 from: $628 |
| 6:00 am | 6h | 1:42 pm | US Airways | via Phoenix | 3 from: $399 |
| 6:00 am | 6h | 1:50 pm | United | via Denver | 1 from: $477 |
| 6:10 am | 6h | 1:50 pm | Frontier, United | via Denver | 1 from: $497 |
| 8:32 am | 5h | 3:54 pm | United | via Denver | 1 from: $477 |
| 9:15 am | 6h | 5:04 pm | US Airways | via Phoenix | 2 from: $438 |
| 9:16 am | 6h | 5:14 pm | United | via Chicago | 1 from: $510 |
| 10:55 am | 6h | 6:45 pm | American | via Chicago | 2 from: $628 |
| 12:58 pm | 4h | 6:49 pm | United |  | 2 from: $488 |
| 1:14 pm | 6h | 9:18 pm | United | via Denver | 1 from: $477 |
| 3:40 pm | 6h | 11:42 pm | US Airways | via Phoenix | 3 from: $392 |
| 4:35 pm | 5h | 11:48 pm | Delta | via Salt Lake City | 2 from: $566 |
| 11:03 pm | 6h | 7:10 am +1 | United, American | via Chicago | 1 from: $536 |
| 11:59 pm | 6h | 8:07 am +1 | United | via Chicago | 2 from: $499 |

⤶ 1120

[Add next 10 results]  flights will be over $812 or >6h 00 minutes long  ⟵ 1110

*FIG. 11*

1300 flights                                    Search          1304
                                                           1302

Everything          From:   San Francisco (SFO)    To:    Saint Louis (STL)       1312
Flights             Depart: Tue July 12            Return: Sat July 16
Any number of stops Price:  Under $812 (auto)      Duration: Under 6h 09m (auto)
0 stops (direct)                                                                  1318
1 stop              Lowest price flight is $380, but it is quite long (over 8hrs)  Show lowest fares anyway
Any airline                                                                       1310    1306
Specific airlines...  Outbound flight  San Francisco to Saint Louis  1316

Any connection      Takeoff ▾  Dur.  Arrival   Airline          Connections        Round trip
Only via...         6:00 am    6h    1:40 pm   American         via Dallas         2 from: $628
Any outbound time   6:00 am    6h    1:42 pm   US Airways       via Phoenix        3 from: $399    1320
Custom time...      6:00 am    6h    1:50 pm   United           via Denver         1 from: $477
Any return time     6:10 am    6h    1:50 pm   Frontier, United via Denver         1 from: $497
Custom time...      8:32 am    5h    3:54 pm   United           via Denver         1 from: $477
                    9:15 am    6h    5:04 pm   US Airways       via Phoenix        2 from: $438
    1314            9:16 am    6h    5:14 pm   United           via Chicago        1 from: $510
                    10:55 am   6h    6:45 pm   American         via Chicago        2 from: $628
                    12:58 pm   4h    6:49 pm   United                              2 from: $488
                    1:14 pm    6h    9:18 pm   United           via Denver         1 from: $477
                    3:40 pm    6h    11:42 pm  US Airways       via Phoenix        3 from: $392
                    4:35 pm    5h    11:48 pm  Delta            via Salt Lake City 2 from: $566
                    11:03 pm   6h    7:10 am +¹ United, American via Chicago       1 from: $536
                    11:59 pm   6h    8:07 am +¹ United          via Chicago        2 from: $499

Add next 10 results   flights will be over $812 or >6h 09 minutes long

*FIG. 13*

FLIGHTS SEARCH

BACKGROUND

This specification relates to information retrieval.

Users can use various web sites to plan travel. Conventionally, a user navigates to either a web site corresponding to a particular provider (e.g., a specific airline) or to a web based travel site that provides access to several different providers. Once the user has identified an itinerary for travel, they can typically purchase the itinerary directly through the web site.

SUMMARY

This specification describes technologies relating to information retrieval.

In general, one aspect of the subject matter described in this specification can be embodied in methods that receiving a search query in a search interface; determining that the received search query is a flights-related query; and in response to determining that the search query is a flights-related query and without further user input, providing a flight search interface including a plurality of search dimensions and a plurality of flight search results, each dimension associated with an attribute of flight search and each dimension having an associated value, wherein one or more dimension values correspond to values extracted from the search query, and wherein the plurality of flight search results are filtered according to the dimension values. Other embodiments of this aspect include corresponding systems, apparatus, and computer programs recorded on computer storage devices, each configured to perform the operations of the methods.

These and other embodiments can optionally include one or more of the following features. One or more of the plurality of dimensions can be associated with default values. Determining that the received search query is a flights-related query can be based on processing the received search query. One or more of the values associated with the dimensions can be adjustable based on user input. The method can further include receiving user input adjusting one of the default values; and automatically updating the flight search results in response to the user input.

Determining that the received search query is a flights related query can include identifying one or more keywords associated with flight queries. Flight search results are automatically updated in response to further user input modifying one or more dimension values. The method can further include: providing a link to one or more third party booking sites in response to a user selection of one or more flight search results.

The flights search interface can include a dimensions portion and a flight search results portion. The dimensions portion can include an interactive map and the user can modify an origin or destination value through a map input. The dimensions portion can include a flights scatterplot displaying flights with respect to a pair of dimensions. The method can further include: receiving a user input modifying a marker position associated with one or more of the pair of dimensions in the scatterplot; and updating flight search results according to flights within the region of the scatterplot demarcated by the user input. A first dimension of the pair can be a price and a second dimension of the pair can be a duration.

The method can further include: receiving a user input selecting a particular flight search result; and in response to the selection, presenting one or more associated return flight search results. Presenting the one or more associated return flight search results can include displaying the one or more associated return flight search results inline below the selected flight search result. A user selection of a flight search result and a return flight search result can identify a selected itinerary.

The plurality of dimensions can include an automatically-computed maximum duration limit and an automatically-computed maximum price limit. The maximum duration limit and the maximum price limit can be automatically updated in response to further user input modifying one or more dimension values. The method can further include: presenting a user interface element that, when selected by a user, causes additional search results to be displayed. The method can further include: in response to a user input selecting the user interface element, adjusting at least one of the maximum duration limit and the maximum price limit, wherein the additional search results satisfy the adjusted maximum duration and price limits.

In general, another aspect of the subject matter described in this specification can be embodied in methods that include the actions of providing a flight search interface including a plurality of search dimensions, each dimension associated with an attribute of flight search and a value of each dimension being configurable by a user, the flight search interface including a dimensions portion and a flights search results portion, the dimension portion including a flights scatterplot displaying flights with respect to a pair of dimensions; receiving user input specifying one or more dimension values; and providing flight search results that are filtered according to the dimension values. Other embodiments of this aspect include corresponding systems, apparatus, and computer programs recorded on computer storage devices, each configured to perform the operations of the methods.

These and other embodiments can optionally include one or more of the following features. Flight search results can be automatically updated in response to further user input modifying one or more dimension values. The method can further include: providing a link to one or more third party booking sites in response to a user selection of one or more flight search results. The method can further include: replacing, in the dimensions portion, the flight scatterplot portion with an interactive map in response to a user input selecting a user interface element associated with the interactive map, wherein the user can modify an origin or destination value through a map input to the interactive map.

The method can further include: receiving a user input modifying a marker position associated with one or more of the pair of dimensions in the scatterplot; and updating flight search results according to flights within the region of the scatterplot demarcated by the user input. A first dimension of the pair can be a price and a second dimension of the pair can be a duration.

The method can further include: receiving a user input selecting a particular flight search result; and in response to the selection, presenting one or more associated return flight search results. Presenting the one or more associated return flight search results can include displaying the one or more associated return flight search results inline below the selected flight search result. A user selection of a flight search result and a return flight search result identifies a selected itinerary.

The plurality of dimensions can include an automatically-computed maximum duration limit and an automatically-computed maximum price limit. The maximum duration limit and the maximum price limit can be automatically updated in response to further user input modifying one or more dimension values. The method can further include: presenting a user interface element that, when selected by a user, causes additional search results to be displayed. The method can further include: in response to a user input selecting the user interface element, adjusting at least one of the maximum duration limit and the maximum price limit, wherein the additional search results satisfy the adjusted maximum duration and price limits.

Particular embodiments of the subject matter described in this specification can be implemented so as to realize one or more of the following advantages. Flight searches can be performed by extracting search dimensions from a user submitted query, which allows for expressive queries. Search results can be dynamically updated in response to user modifications to dimensions providing quick updates to streamline searching. Default filtering can also streamline results by removing duplicate codeshares and hiding options unlikely to be selected by users.

Users can use the flight search interface to explore flight options, for example, through map selections. Maximum price and duration limits for the search results can be automatically computed so that a manageable number of search results are initially presented. The maximum price and duration limits can be automatically adjusted in response to user modifications of dimensions so that a user modification does not result in an unreasonably large number of search results being displayed. Users can easily modify the price and duration limits, for example, to view additional search results that are not displayed or to view a smaller number of results.

Users can interact with a travel calendar and an associated travel graph to allow users having travel flexibility to easily view prices for trips of varying lengths and departure and arrival dates. Users can interact with a map to easily identify potential destinations from a specified origin location, and to easily determine which of those potential destinations are accessible given the currently specified dimension values. Users can interact with a scatterplot to easily visualize the prices and durations of flight options that satisfy the currently specified dimension values, as well as prices and durations of flight options that do not satisfy one or more of the dimension values. Flight options can be presented in a dense and easily navigable form, e.g., as a single row of data per flight. Additionally, using a hierarchical presentation of round trip itineraries that groups outbound flights and then expands inline to show return flights reduces the number of results that a user needs to consider in making flight decisions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example flight search interface that includes a travel calendar.
FIG. 11 is an example flight search interface that includes an add results element.
FIG. 13 is an example flight search interface including a cheapest flight link.

Like reference numbers and designations in the various drawings indicate like elements.

DETAILED DESCRIPTION

A flight search interface is provided in response to a user input in a search interface. For example, a user search query can be identified as a flights-related query or a user can select a flights option in the search interface. The user can use the flight search interface to explore itinerary options. An itinerary, particularly a flight itinerary, is a collection of one or more flight segments that the user can purchase. In particular, an itinerary identified through the flight search interface can be passed on to a booking site for purchase.

A flight segment is a specific nonstop flight. A user can take multiple segments to get between an origin and a destination. The origin is the city or airport from which the user begins a journey. The destination is a city to which the user stops, but is not a temporary transit point between segments. A multicity itinerary can have multiple destinations.

A routing between the origin and destination locations is a leg. Thus, a round trip ticket contains two legs, one in each direction. Each leg can include multiple segments. For example, a leg for a user flying from San Francisco to Tel Aviv can include a first segment from San Francisco to Los Angeles and a second segment from Los Angeles to Tel Aviv.

The flight search interface presents flight information based on a number of different dimensions. Each dimension can be filtered to provide itineraries that contain particular dimension values. A user can explore flights using a map presented within the flight search interface that allows the user to view initial information about a number of different destinations from a specified origin.

In some implementations, based on user input of an origin and destination, flight search results are presented within the flight search interface. These flight search results can be dynamically updated as the user edits dimension values. In particular, in some implementations, a price duration scatterplot presents all flights matching given criteria. The user can adjust position markers to confine results to a particular range of flight durations and prices. The presented search results are updated in response to the adjustments. Once a user has selected a particular itinerary, the user can select a link to a third-party provider in order to complete the transaction.

Figure 1:
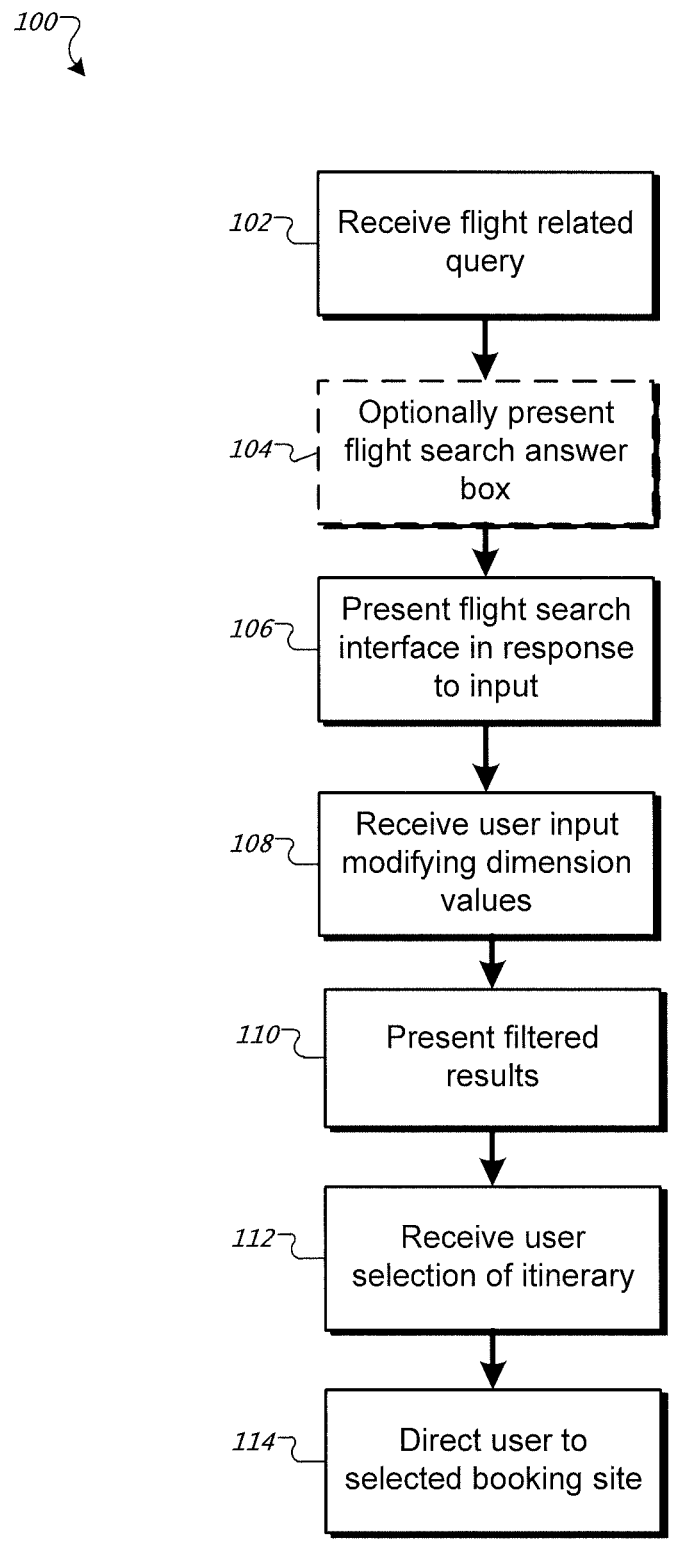
FIG. 1 is a flow diagram of an example process for flight searching.

FIG. 1 is a flow diagram of an example process 100 for flight searching. For convenience, the process 100 will be described with respect to a system including one or more computing devices that performs the process 100.

The system receives 102 a flight-related search query. For example, the user can input the search query in a search field of a search interface. The search query can be processed to determine whether or not the search query is a flight-related query. For example, keywords in the query or particular query phrases can be used to identify the search query as a flight-related query. Example keywords can include "flights" as well as the names of cities or airport codes (e.g., "SFO" for San Francisco International Airport). Additionally, linking cities or airport codes with "to" or "from" can indicate a flights-related query, for example, "flights from SFO to LHR".

The received flight-related search query optionally triggers a flight search answer box (e.g., a OneBox) module. The system provides 104 the flight search answer box with search results obtained in response to the query. Answer box modules display specially formatted information when triggered in response to particular types of queries (e.g., movies, weather, or music). For example, if the user's query refers to weather in a particular location, the answer box can include a forecast of weather in the particular location. An answer box has a category that is one of a predefined group of categories, and is formatted according to a template specific to its category. An answer box can also be associated with code that defines how content for the answer box is obtained. The code can be, for example, scripts or code identifying a back end server from which the content is received.

The flight search answer box can include summary flight information responsive to the query, for example, a typical or lowest price, a number and duration of flights, airlines serving the particular route, as well as third party destinations from which a flight can be purchased.

The system provides 106 a fight search interface in response to a user input. In some implementations where an answer box is presented, the answer box includes a link selectable by the user to enter the flight search interface.

In some other implementations, regardless of whether a flights search answer box is provided, search results obtained in response to the query terms are presented. However, the search results page can include a selectable flights tab (e.g., tabs in a search interface for topic specific searches, for example, images, news, books, shopping, blogs). A user selection of the flights tab triggers presentation of the flight search interface. Alternatively, in some other implementations, when a user submits a search query identified as a flight search query, the system automatically, e.g., without any further user input after submitting the search query, presents the flight search interface without providing intermediate search results.

The presented flight search interface can be automatically populated with information extracted from the flights search query. For example, if the received query is "flights from SFO to LHR" the query can be interpreted as having an "Origin: SFO" and a "Destination: LHR." This origin and destination can be prepopulated into the flight search interface, i.e., displayed in the flight search interface without additional user input when the interface is initially presented to the user. Alternatively, the query "flights from SFO" only prepopulates the origin. In some implementations, a query includes multiple dimensions that are parsed to populate corresponding dimension values allowing the user to input more expressive queries, for example: "nonstop flights from ZRH to somewhere <4 hours away, leaving on a Friday after 6 pm, returning that Sunday after 7 pm." Additionally, the presented flight search interface can include flight search results that satisfy the dimension values extracted from the flight search query. For example, for the query "flights from SFO to LHR," in addition to prepopulating the origin and destination, the flight search interface can be prepopulated with flight search results that identify flights having an origin of SFO and a destination of LHR. As will be discussed in more detail below, the flight search results may also satisfy one or more default values of other dimensions and can be automatically updated in response to a user input adjusting one or more of the dimension values. The flight search interface includes other dimensions having values that can be modified by the user. These modifications can be used to identify results filtered to those values of the dimensions. Dimensions are properties of a flight itinerary. Dimensions include, for example, flight origin and destination, departure and arrival dates and times, airlines, flight numbers, flight time, trip length, connecting airports, classes of service, number of stops, and baggage fees.

In some implementations, some dimensions are initially hidden in the flight search interface. These dimensions can be presented, for example, in response to a user input requesting display of additional dimensions. In some implementations, dimensions are grouped according to particular criteria.

For example, primary dimensions can include an origin, destination, departure date, return date, maximum price, and maximum duration. The primary dimensions can be presented together in a particular location of the flights search interface. For example, the primary dimensions can be positioned prominently in the flight search interface as the ones most likely to be modified by users to filter flight search results.

Secondary dimensions can include airlines, groups of airlines (e.g., OneWorld, SkyTeam, and Star Alliance), stops, connecting airports, outbound times, and return times. In some implementations, because these secondary dimensions are less often modified by users to filter flight search results, they can be positioned in a different location in the flight search interface from the more-frequently modified primary dimensions.

Other dimensions can be hidden initially, but expanded upon user request, for example, class of service, availability of Wi-Fi service, number of bags allowed as carry-on or checked luggage, bag check fees, in-seat entertainment, and airline quality ratings.

The system can use default values for one or more dimensions. In particular, in some implementations, default values are selected to constrain the results set. For example, dimensions can be filtered according to default values for maximum price or duration dimensions (e.g., users may be unlikely to select a flight option that is longer than a specified amount of time relative to the duration of other flight options). In another example, default connections can be limited because users are unlikely to select a flight leg with more than two segments. In some other implementations, default values are used to remove codeshare flights to avoid duplication in search results.

Figure 2:
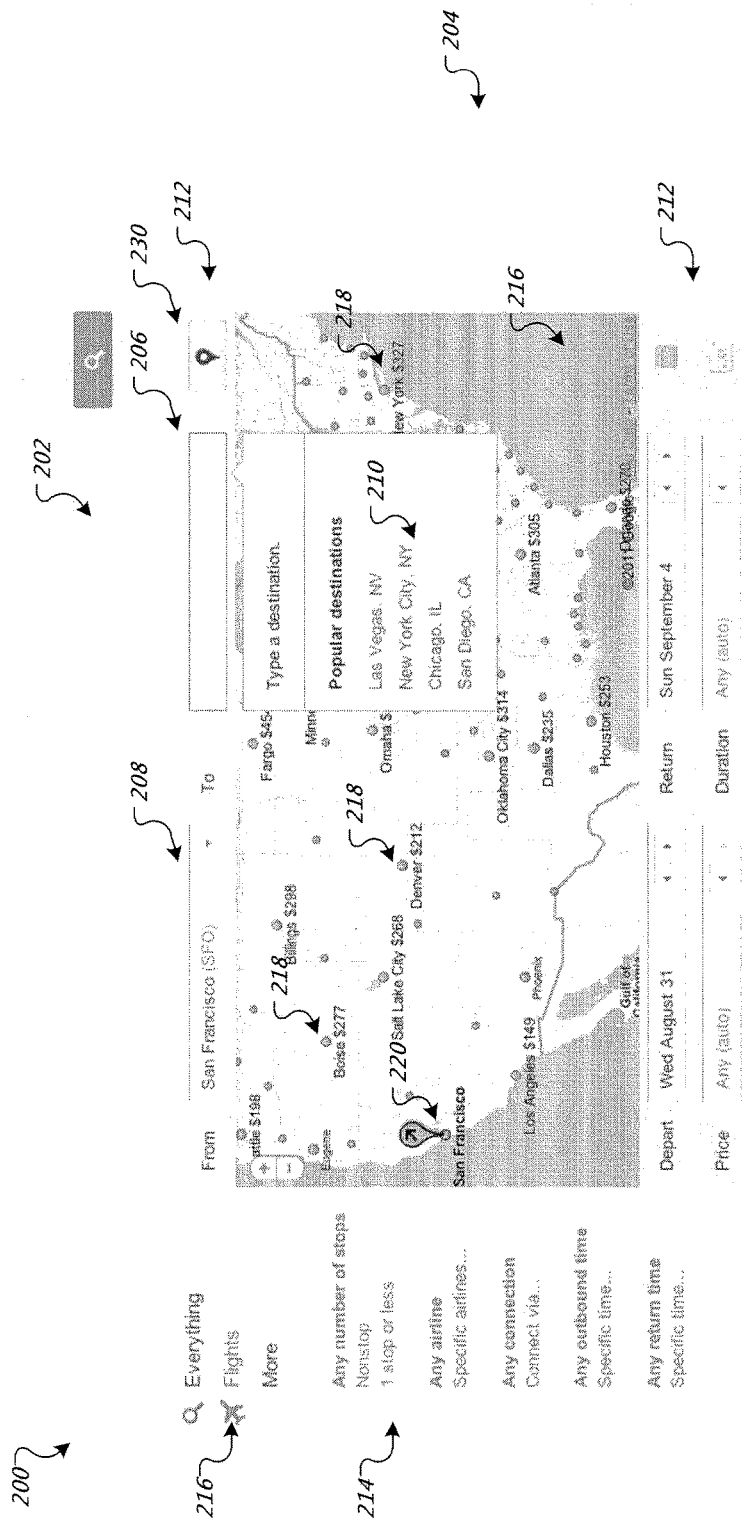
FIG. 2 is an example flight search interface.

FIG. 2 is an example flight search interface 200. The flight search interface 200 includes a search query input field 202 and a dimensions portion 204. The dimensions portion 204 includes primary dimensions 212, secondary dimensions 214, and map 216. The map 216 can be used to specify the origin and destination dimensions. Alternatively, the origin and destination can be entered directly into an origin field 206 and a destination field 208, respectively.

In the illustrated example, the origin has been specified as "San Francisco (SFO)." In some implementations, the origin field 206 has been prepopulated because the user interface 200 was provided in response to receiving a search query seeking information about flights originating from San Francisco or, more specifically, San Francisco International Airport, which has the airport code SFO. For example, the received search query may have been "flights from SFO" or "flights from San Francisco." Alternatively, a user may have entered the origin directly into the origin field 206. For example, the user may have selected a flights tab, e.g., flights tab 216, on a search engine interface, which resulted in the flight search interface 200 being provided without any prepopulated origin or destination information.

To assist a user in entering a destination location, a drop-down box is presented that includes popular destinations 210. The drop-down box is displayed as an overlay to the interface. In some implementations, the presentation of the drop-down box can be triggered by a user input selecting the destination field 208. Alternatively, the presentation of the drop-down box may be triggered when a user completes the input of the origin into the origin field 206.

The popular destinations 210 may be particular to the specified origin location. For example, the popular destinations may be the locations having the most non-stop flights from the origin location, the locations that are most frequently the destination of purchased itineraries originating from the origin location, or the locations most frequently included in the same flight-related query as the origin location.

In some implementations, once the user has begun to input a destination location, the drop down box displays additional information to assist the user in selecting a correct location. For example, the drop down box can offer input suggestions of potential destinations that match the user input. Additionally, the drop down box can present names of airports that are nearby the location entered by the user as well as the distance of each airport from the location. The user can then select one or more of the presented airports to specify the destination location. For example, if the user input is "bos" the drop down box can display a suggestion "Boston, MA" or "Boston, MA Logan International Airport." In another example, if the user input is a street address, e.g., "12345 Main Street, New York, NY," the drop down box can display one or more airport names and the distance from the address to the airport, e.g., "La Guardia International Airport, 22 miles" and "John F. Kennedy International Airport, 30 miles."

Other primary dimensions 212 include departure and return dates, price, and duration. For example, the user can enter specific dates into respective fields for departure and return. Alternatively, selecting the field can trigger presentation of a calendar (e.g., as an overlay to the interface) allowing a user to select a specific date. In some implementations, the user further specifies a time or time range for the departure and return. The price dimension can allow direct user input or selection of ranges or maximum/minimum prices from, for example, drop down menus. Alternatively, editing price and duration can be performed using a flights scatterplot described below with respect to FIGS. 3-4.

The map 216 includes indicators of particular destinations 218, shown in the map 216 as dots. The dots are optionally displayed with an associated price, the associated price indicating the price of a trip from the currently selected location city to the destination (e.g., a lowest determined price). The currently input values for origin and destination can be indicated within the map 216, e.g., with particular markers. For example, the origin can be indicated with a marker 220 indicating a departure. In some implementations, the destinations 218 are major destinations, e.g., cities that have populations exceeding a threshold or cities that have been identified as tourist attractions. In some other implementations, the destinations 218 correspond to popular destinations from the selected origin location, e.g., the destinations that are the destination of the most outbound flights from the selected origin or the cities that most frequently appear in the same flight search query as the selected origin.

The destinations shown on the map can be adjusted in response to user input. For example, in response to a user input modifying the specified origin location, the particular destinations shown on the map can also be adjusted to, e.g., to show popular destinations from the new specified origin location instead of the old origin location. Additionally, in some implementations, a user can interact with the map to increase or decrease a level of zoom. In response to the user interaction, the particular destinations shown on the map can be adjusted. For example, in response to a user input zooming the map in, i.e., causing the map to only display a smaller portion of the United States, smaller or less-popular destinations that are not currently displayed may be indicated on the map. Conversely, in response to a user input zooming the map out to display multiple continents, smaller destinations within the United States may no longer be shown, and popular destinations on other continents may be added.

The map 216 can be used to explore potential destinations. For example, if only an origin location is specified, the user can select a destination directly within the map 216 for which corresponding flight search results 208 can be displayed in a search results portion of the interface. For example, selection of a particular dot on the map 216 can automatically populate the destination field, which can then be used to generate corresponding search results.

Additionally, in some circumstances, user input in the destination input field 208 can cause the level of zoom of the map 216 to change to allow the user to effectively select a destination location. For example, if the user enters a location into the destination input field 208 that is on a higher level of granularity than a city, the map can, either automatically or in response to a user input selecting a map indicator 230, be adjusted to only display cities or airports within the destination location. An input that is on a higher level of granularity than a city can be, for example, a state (e.g., California or Florida), a country (e.g., Japan or Spain), or a region (e.g., the San Francisco Bay Area or the Middle East). Thus, by interacting with both the destination input field 208 and the map 216 the user can easily select particular destination cities or airports within their specified location.

In some implementations, when a user places a cursor over a dot in the map 216, information is presented about the destination (e.g., as a tool tip or pop-up). The information can include a name of the destination or other destination information. Additionally, a selected destination can also result in additional destination information being presented within the map 216. This information can include, for example, a description of the destination city, images, weather, time zone, and distance from the airport to the city.

While the above map functionality has been described with respect to displaying potential destinations of a trip from a particular origin, in some implementations, if the user specifies a destination without specifying an origin, the user can interact with the map 216 to select an origin. For example, the map 216 can include potential origins having flights to the specified destination.

The secondary dimensions 214 include a number of different dimensions and options for specifying values or value ranges for the dimensions. For example, the number of stops can be selected as any, 0, 1, or 2 or more. In another example, an airline dimension allows the user to specify any airline, selected airline groups, or specific individual airlines. In some implementations, selecting "specific airlines . . . " causes an expanded list to be presented, for example, within the secondary dimensions 214 or in a pop-up or overlay list (e.g., with checkboxes for each airline). Other secondary dimensions 214 can also be customized, for example, connection locations, and outbound and return times.

If the user selects a value for a secondary dimension 214, e.g., by clicking on the value with an input device, the search results 208 are filtered according to the selection. In some implementations, each secondary dimension 214 is given the broadest value by default. The selected value can be indicated visually. For example, in the flight search interface 200, the selected values for secondary dimensions 214 are presented in bold.

Figure 3:
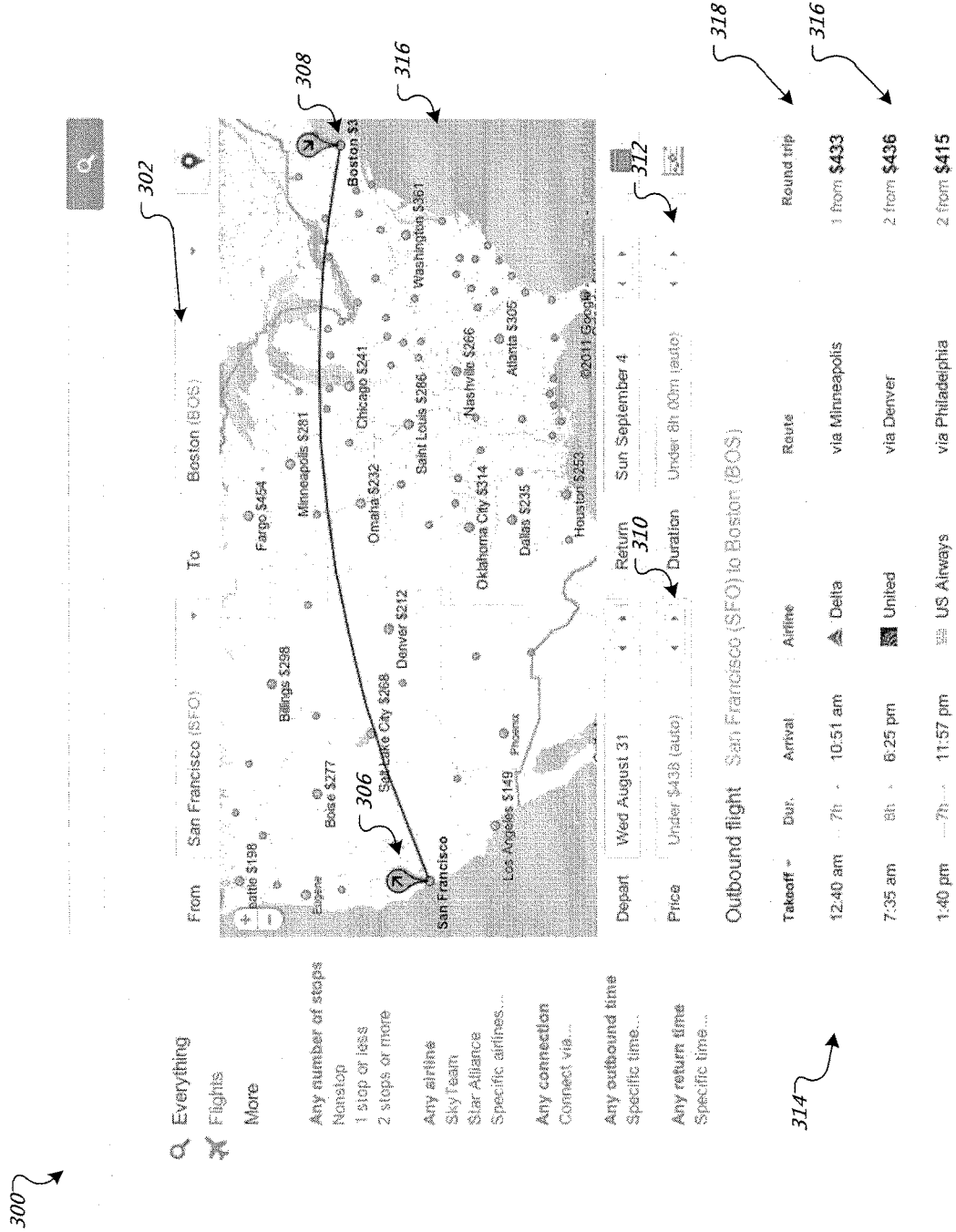
FIG. 3 is an example flight search interface that includes a search results portion.

FIG. 3 is an example flight search interface 300 that includes a search results portion 314. In the flight search interface 300 a destination location of "Boston" has been specified, e.g., by way of user interaction with a map 316 or by direct user input into a destination input field 302. As a result, the map 316 includes an origin marker 306 and a destination marker 308. The origin and destination markers are connected on the map with a line segment and are visually distinct to indicate that one represents the origin and the other the destination of a potential trip. A user may select a different origin or destination location by, for example, selecting one of the destinations indicated by a dot on the map 316.

The search results portion 314 includes a sortable list of search results 316 that satisfy the specified dimensions. The search results 316 can be sorted according to different sorting criteria 318. Specifically, the search results portion 306 includes sortable columns for departure time, duration, arrival time, airline, connections, and round trip price. The search results 316 include the corresponding information, if any. For example, direct flights do not have any connections.

Each search result of the search results 316 can be presented as a single row of information. As such, the information for each flight represented by one of the search results can provide limited information that allows a user to make a decision about the flight while also allowing the different flight options to be easily navigated. For example, a given flight option shown in the search results 316 can be limited to departure time, arrival time, airline, connections, and price while avoiding other information that is less useful in searching for flights e.g., flight number.

In response to the user input identifying the destination location, maximum price limit 310 and maximum duration limit 312 are automatically computed and displayed. Each of the search results 316 satisfies the maximum price and duration limits. Thus, the maximum price and duration limits may be calculated, for example, in such a way as to ensure that a manageable number of search results that are likely to be attractive to the user are displayed. If a user adjusts a dimension through the flight interface 300, the maximum price and duration limits may automatically be re-calculated and the new values of the limits displayed. In some implementations, automatically calculating the price and duration limits may cause flights from certain airlines or the cheapest possible flight to not initially be displayed. In these implementations, the interface 300 can include elements that allow a viewer to easily view these omitted flights. These elements will be described in more detail below with reference to FIGS. 12-16.

As shown in FIG. 1, the system receives 108 user input modifying dimensions. Some dimensions can include fields from which the user can directly input values. For example, the origin and destination fields can allow users to directly type a location city, country, or airport code. Other dimensions can be represented by drop down menus or selectable options. For example, a number of stops can be selected from a set of displayed options (e.g., 0 stops, 1 stop, or 2+ stops). Other dimensions can include multiple forms of input. For example, entering a date of travel can be a direct input or can trigger a calendar representation from which the user can select a particular date.

In some implementations, user input modifying dimensions are provided through an additional graphical representation. For example, dimensions for modification can be presented using a map representation, a presented flights scatterplot, a travel calendar, or a graph portion associated with the travel calendar.

The system provides 110 filtered results. In particular flights are filtered according to the values of each dimension. The provided results can be presented in a list in the flights search interface. In some implementations, only the outbound flights are initially presented. These flights can be ordered according to different user selectable criteria. For example, the flights can be listed by departure time initially, but can be sorted, for example, by arrival time, airline, connections, and round trip price (if a round trip flight is selected).

The user can make further modifications to one or more dimensions. The search results are updated according to the modifications. In particular, the results can be filtered and presented dynamically as the user changes dimension values.

Flight search results can be identified by a search system that identifies potential flight itineraries responsive to a submitted query. The values of the dimensions can act as restrictions or additional components of the query. The search system can use the received information from the flights search interface to identify responsive flight search results. Specific flight information can be searched, for example, based on scheduling and fare rules information provided by the airlines and, in some implementations, through one or more intermediaries.

Figure 4:
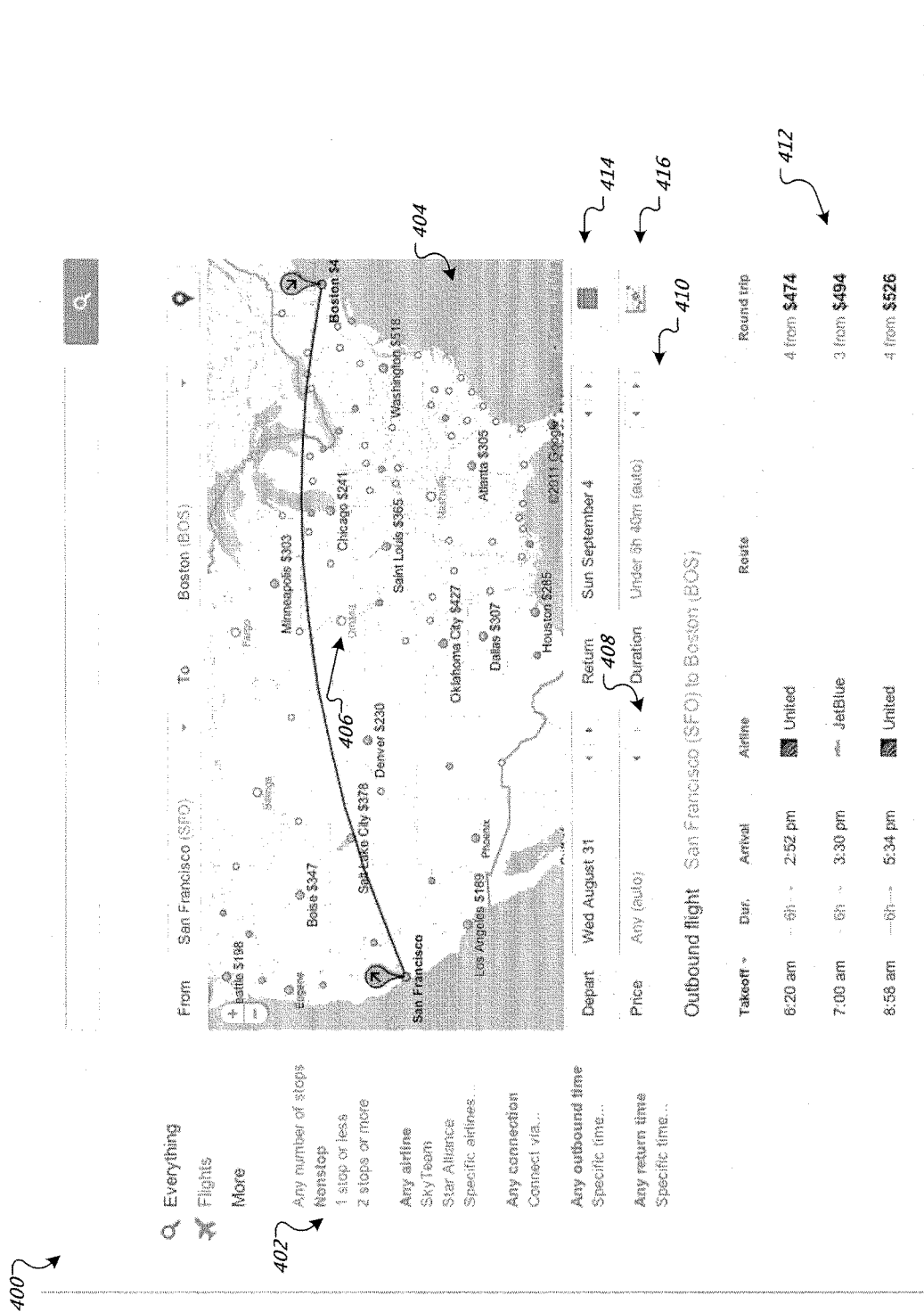
FIG. 4 is an example flight search interface that includes filtered search results.

FIG. 4 is an example flight search interface 400 that includes filtered search results 412. In the flight search interface 400, a user has modified the value of a number of stops dimension 402 to indicate that the user is only interested in nonstop flights. In response to the modification, the maximum price limit 408 and the maximum price limit 410 have been automatically adjusted. Additionally, the appearance of some of the particular locations identified by dots on a map 404 has been altered to indicate that no flights exist to that destination that satisfy the new dimension values, i.e., the new value of the number of stops dimension and the new values of the maximum price and duration limits. For example, because no flights could be identified between San Francisco and Omaha that are nonstop and have a duration of less than 8 hours, the appearance of the dot 406 representing Omaha has been altered to make the dot visually distinct from those dots representing locations to which nonstop flights from San Francisco lasting less than 8 hours are available (e.g., an empty circle for unavailable destinations compared to a filled-in dot for available destinations).

Additionally, modified search results 412 are displayed that satisfy the modified dimension values. That is, only search results that represent nonstop flights from San Francisco to Boston are displayed.

The interface 400 also includes a calendar user interface element 414 and a scatterplot user interface element 416. In response to receiving an input selecting the calendar element 414, a travel calendar can be displayed, e.g., in place of the map 404, that allow a user to easily adjust the values of the departure date and return date dimensions. Similarly, in response to receiving an input selecting the scatterplot element 416, a scatterplot can be displayed, e.g., in place of the map 404, that allows the user to easily adjust the values of the maximum price and duration limits. When either the scatterplot or the travel calendar is displayed, a map user interface element can be displayed in place of the user interface element associated with the scatterplot or the travel calendar. In response to receiving an input selecting the map element a map can be displayed, e.g., in place of the scatterplot or the travel calendar.

Figure 5:
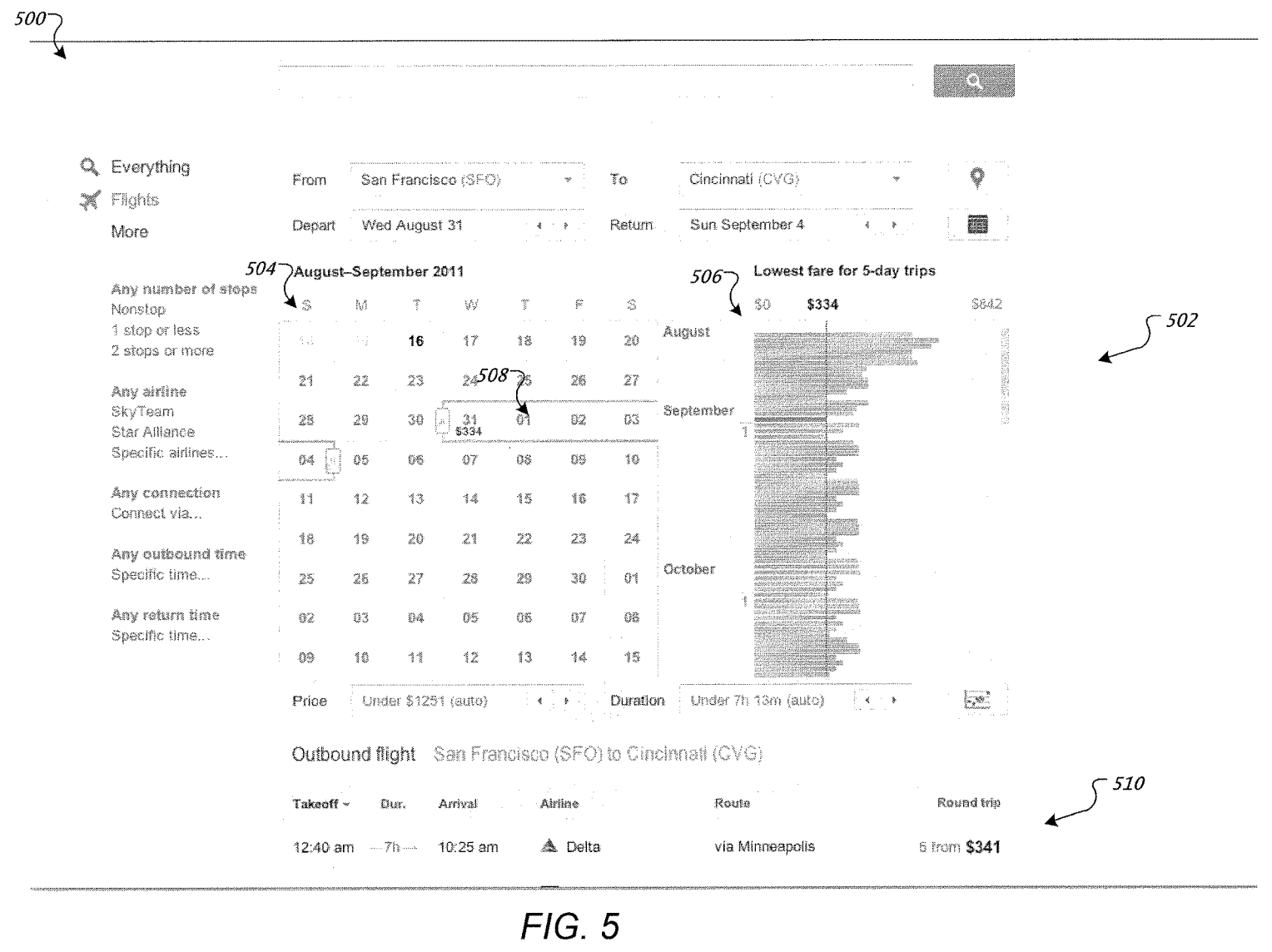

FIG. 5 is an example flight search interface 500 that includes a travel calendar 502. The travel calendar portion 502 includes a calendar portion 504 and an associated graph portion 506.

The calendar portion 504 displays a range of travel dates that includes the specified departure and return dates. For example, the calendar portion 504 can include a date box for each day in a two-month date range that includes the selected departure and return dates. The trip defined by the departure and return dates, i.e., the trip beginning on the departure date and ending on the return date, is denoted within the calendar portion 504 by a highlighted portion 508. The user can interact with the highlighted portion, e.g., by dragging the highlighted portion to different dates within the calendar portion or by increasing or decreasing the length of the highlighted portion to adjust the departure and return dates.

In order for the user to easily view the prices of trips starting on different dates in the range, the graph portion 506 displays, for each of the days in the range, a trip starting on that date and having a duration equal to the duration of the trip defined by the departure and return dates. If the user alters the trip duration, e.g., by interacting with the highlighted portion 508 to change the departure or return date, the prices displayed in the graph portion 506 are adjusted to show prices for trips having a duration equal to the new duration. Thus, by interacting with the calendar portion 504 and the graph portion 506, a user is able to easily identify the impact of scheduling their travel for various dates within the range of dates. Additionally, in response to a user input to either the calendar portion 504 or the highlighted portion 508 changing the specified departure date, return date, or both, the flight search results 510 are modified to only show flight search results satisfying the newly specified dimensions.

Figure 6:
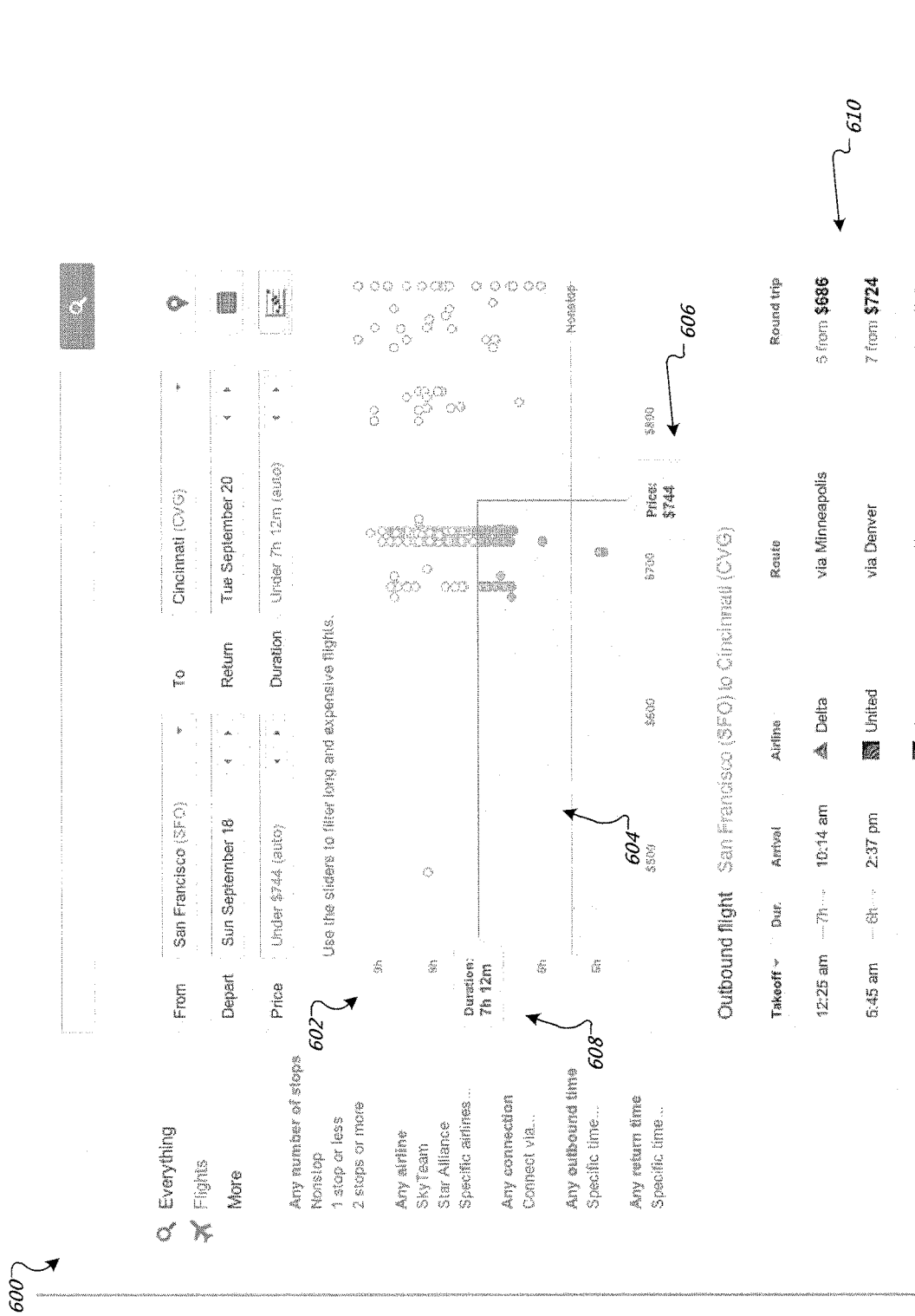
FIG. 6 is an example flight search interface that includes a flights scatterplot.

FIG. 6 is an example flight search interface 600 that includes a flights scatterplot 602. The flights scatterplot 602 provides a visual representation of the fights space as a function of price and duration (e.g., indicated on respective axes of the flights scatterplot 602). Each dot in the flights scatterplot 602 corresponds to a flight that satisfies the dimensions of the flight search interface 600. In particular, flights from San Francisco to Cincinnati on September 18. Additional visual cues can be provided within the flights scatterplot 602 to indicate overlapping flights at a given intersection of price-duration, for example, increased dot density or color changes.

Additionally, the flights scatterplot 602 includes slider bars 606 and 608. The slider bar 606 allows a user to adjust the maximum price. The slider bar 608 allows the user to adjust a maximum duration. Thus, as shown in the flight search interface 600, the slider bar 606 is set to a maximum price of $744 and the slider bar 608 is set to a maximum duration of 7 hours and 12 minutes.

Flights in the flights scatterplot 602 within the area 604 formed by the two slider bar positions correspond to flights that satisfy the price and duration limits. In some implementations, the area includes visual cues demarcating the selected area from the full flights scatterplot 602, for example, using a bounding box or shading.

Search results 610 present flights from San Francisco to Cincinnati that satisfy the dimension values including the defined area of the scatterplot 602. Thus, for example, while a user can visually identify flights in the scatterplot 602 that exceed their price and duration criteria, those flights do not appear in the search results 610. However, the slider bars 606 and 608 can be moved to capture additional flights or fewer flights in the search results 610.

Figure 7:
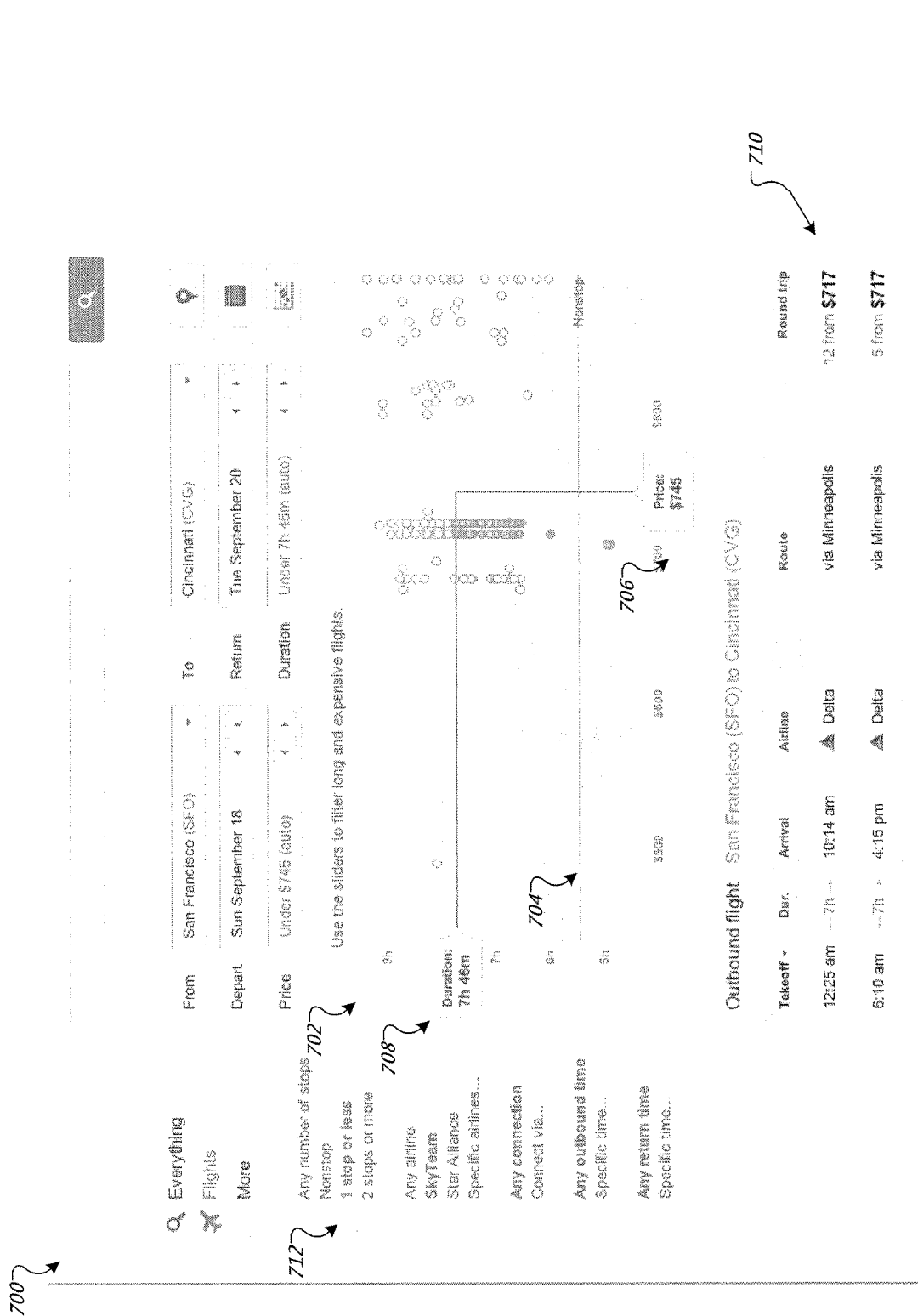
FIG. 7 is an example flight search interface that includes a flights scatterplot.

FIG. 7 is an example flight search interface 700 including a flights scatterplot 702. The flights scatterplot 702 again provides a visual representation of the flights space as a function of price and duration. However, in the flight search interface 700, a user has modified a value of a number of stops dimension 712. Thus, some dots in an area 704 formed by slider bars 706 and 708 correspond to flights that no longer satisfy the dimensions of the search interface 700. In response to the modification, the appearance of the dots has been modified so that the dots within the area 704 that correspond to flights that satisfy each dimension are visually distinct from dots within the area 704 that do not correspond to flights that satisfy each dimension. In particular, dots that correspond to flights that do not satisfy each dimension are not filled in on the scatterplot 702, even if they are within the area 704.

As shown in the flight search interface 700, the slider bar 706 for adjusting the maximum price is set to a maximum price of $745 and the slider bar 708 for adjusting the maximum duration is set to a maximum duration of 9 hours. The positions of the slider bars 706 and 708 may have been automatically updated in response to the user input modifying the value of the number of stops dimension, i.e., because new values for the maximum price and duration were automatically computed as described above with reference to FIG. 3.

Search results 710 present flights from San Francisco to Boston that satisfy the dimension values including the defined area 704 and the newly modified number of stops dimension 712. The search results 710 are updated as the user changes the positions of the slider bars 706 and 708. For example, if the user increases one or more of the maximum duration or the maximum price, more flights may satisfy the criteria, e.g., if movement of the slider bars captures another dot or dots in the scatterplot 702. The search results 710 are therefore updated to include the additional fights. Similarly, if the user decreases one or more of the maximum duration or the maximum price, fewer flights may satisfy the criteria. The search results 710 are updated to include the smaller number of fights that satisfy the filtered dimensions.

The updating of the search results 710 can be performed dynamically after each adjustment to the scatterplot 702 or to any other dimension. In some implementations, the input to a dimension triggers the updated results. In some other implementations, a specified delay without further user input triggers the updated results (e.g., 3 seconds without receiving further dimension modifications).

In some implementations, a user is able to select a dot within the scatterplot. In response, the appearance of the search result in the search results 710 that corresponds to the same flight as the selected dot can be altered, e.g., the displayed search result can be highlighted, to indicate that the search result corresponds to the same flight as the selected dot.

As shown in FIG. 1, the system receives 112 a user selection of an itinerary. In some implementations, the user first selects an outbound leg from the presented results. The system then provides one or more second legs (e.g., a return leg) based on the selected outbound leg. The second leg can be presented as a popup or overlay to the search interface to distinguish the second leg from the search results of the outbound leg. The user can then select a particular second leg. In some multicity itineraries, additional legs can then be selected in a similar manner. The selected legs form an itinerary.

The system directs 114 the user to a selected booking site. In particular, a given itinerary can be provided along with one or more links to booking sites. Each reference to a particular booking site can include the corresponding price for the itinerary. The user can select a particular booking site. The system then directs the user to a corresponding booking site (e.g., a web page corresponding to the particular selection). The system further passes on the selected itinerary to the booking site. The user can then complete the purchase of the itinerary through the booking site.

Figure 8:
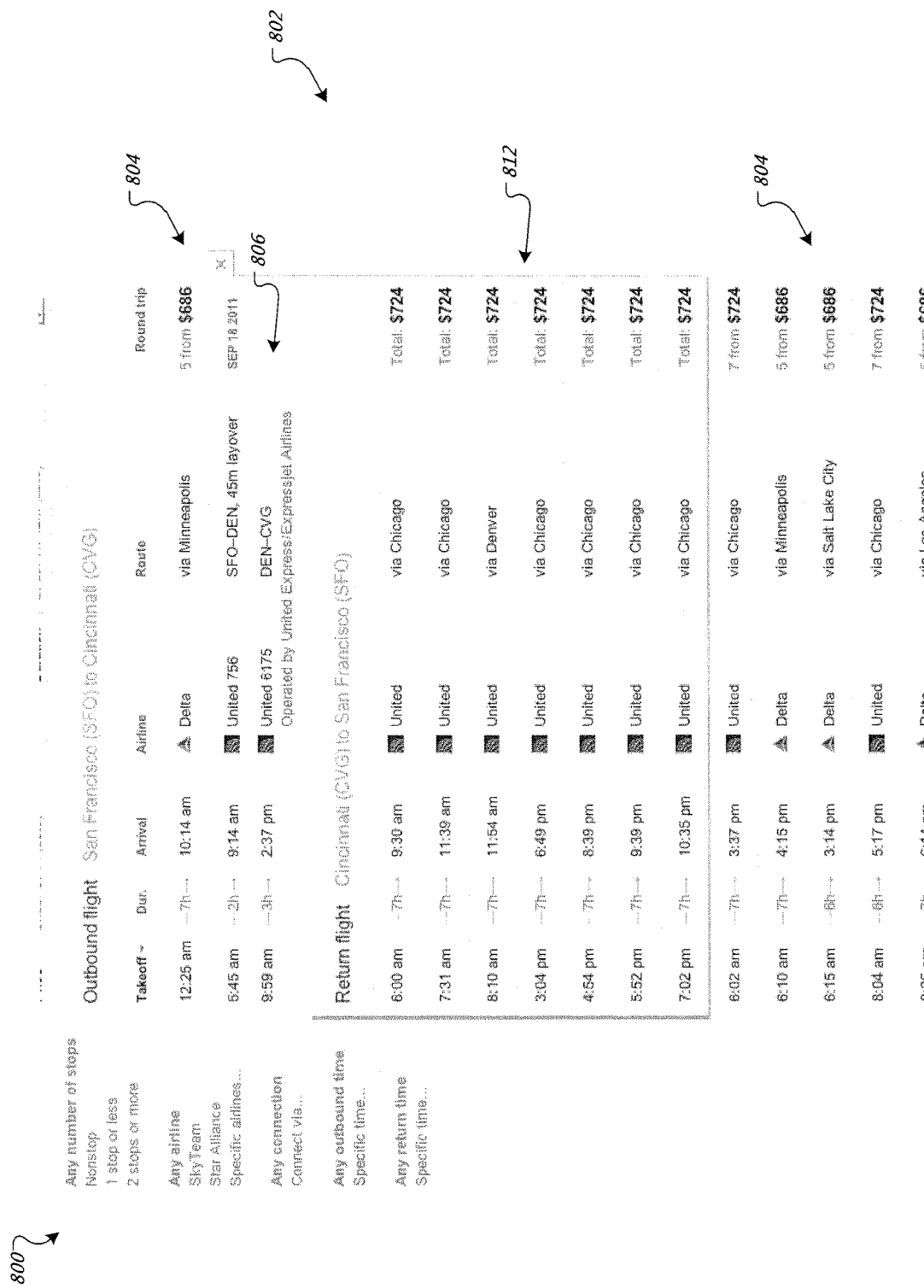
FIG. 8 is a portion of an example flight search interface that includes return flights.

FIG. 8 is a portion of an example flight search interface 800 that includes return flights. The illustrated example shows a search results portion 802 of the flight search interface 804. Other portions, e.g., those discussed above with reference to FIGS. 2-7, may be displayed above or below the search results portion 802 in the flight search interface 800.

The search results portion 802 includes search results 804 that present outbound flights from San Francisco to Cincinnati. The user has selected a particular flight search result 806. For example, the user can select a particular flight from the search results 804 using an input device (e.g., a mouse input or touchscreen input).

Selection of the particular flight search result 806 caused presentation of return flight search results 812. In some implementations, an overlay is generated for the return flights over the outbound flights. In some other implementations, the return flight search results 812 are expanded inline such that the remaining outbound flights below the selected one to be shifted downward so that they are not obscured by the return flights results. Thus, the user can still view all identified search results 804 for outbound flight options.

The return flight search results 812 include search results that satisfy the associated dimensions. Each result can include the same information as with the outgoing flights including flight departure time, duration, arrival time, airline, connections, if any, and round trip fare for the pair of the selected outbound flight 806 and a given return flight. A lowest round trip fare can also be identified in the return flight search results 812.

Figure 9:
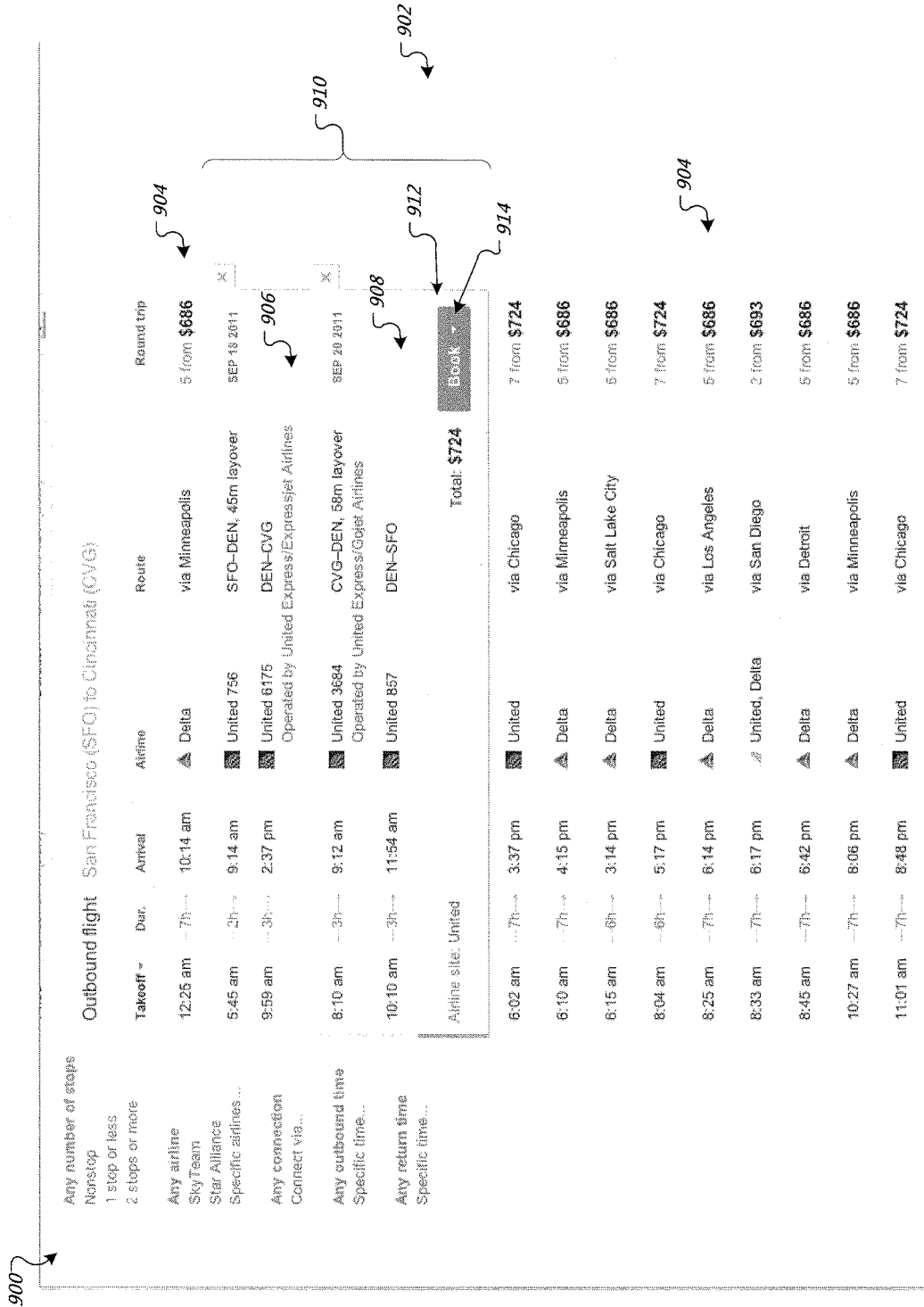
FIG. 9 is a portion of an example flight search interface that includes a including a booking link.

FIG. 9 is a portion of an example flight search interface 900 that includes a including a booking link 912. The illustrated example shows a search results portion 902 of the flight search interface 900. Other portions, e.g., those discussed above with reference to FIGS. 2-7, may be displayed above or below the search results portion 902 in the flight search interface 900.

The search results portion 902 includes search results 904 that present outbound flights from San Francisco to Cincinnati. A user can select an outgoing flight and then a return flight in order to create an itinerary 910. As shown in the flight search interface 900, the user has selected a particular outbound flight search result 906. The user has also selected a return flight search result 908 from return flight search results that were presented in response to the user selection of the outbound flight search result 906, e.g., the return flight search results 812 of FIG. 8.

Once the user has selected a particular itinerary, the user can select the booking link 912 in order to be connected to a particular booking site in order to purchase the selected itinerary. In some implementations, a single third party booking site, e.g., a web based travel site or the website of the airline operating the flights that make up the itinerary, is identified for purchasing the selected itinerary. Alternatively, in some implementations, links to multiple booking sites can be presented in response to a user selection of the booking link 912 along with the corresponding fares for the itinerary through each booking site, respectively. Additionally, a booking site link can be an advertisement, e.g., a booking provider can purchase the right to have a link to the booking provider's website be shown as a booking link for particular itineraries. In some implementations, a booking site link includes a promotional offer. For example, an airline miles bonus, or discount when combined with a hotel or rental car reservation. The booking provider can purchase the ability to advertise the promotion with the booking link.

Selection of the arrow indicator 914 by the user can trigger a presentation of a user interface element, e.g., a drop down box, that allows the user to specify additional dimensions, e.g., number of passengers, before proceeding to book a fare. Promotional offers can also be displayed in the user interface element instead of or in addition to the additional dimensions.

In some implementations, in response to the user selection of the booking link 912, a new search is performed to confirm the pricing and availability of the selected itinerary. That is, a new query can be issued to verify that the pricing and availability of the selected itinerary has not changed from any of the booking sites that have been identified for purchasing the selected itinerary. Thus, a user can be alerted to any changes in price or availability of their selected itinerary before they begin the booking process.

Figure 10:
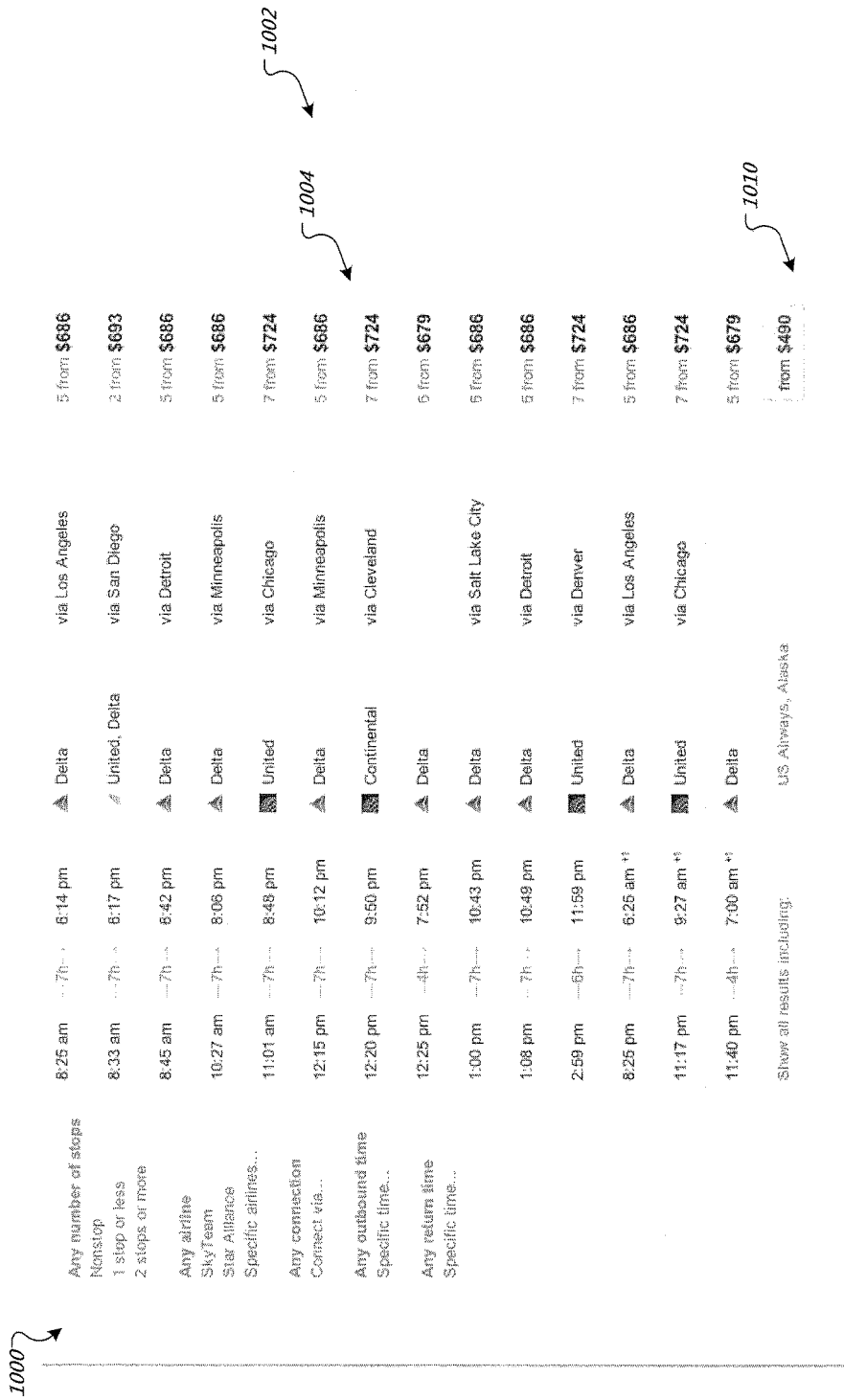
FIG. 10 is a portion of an example flight search interface that includes a synthetic row.

FIG. 10 is a portion of an example flight search interface 1000 that includes a synthetic row 1010. The illustrated example shows a search results portion 1002 of the flight search interface 1000. Other portions, e.g., those discussed above with reference to FIGS. 2-7, may be displayed above or below the search results portion 1002 in the flight search interface 1000. The other portions can include portions for specifying primary and secondary dimensions and maximum price and duration limits.

The search results portion 1002 includes search results 1004 that satisfy each specified dimension and the maximum price and duration limits. The search results portion 1002 also includes a synthetic row 1010 that indicates that, while flights from additional airlines are available that satisfy the specified dimensions, they are not currently being displayed, e.g., because each flight from those airlines exceeds either the currently specified maximum price limit or the currently specified maximum duration limit. The synthetic row 1002 also indicates a lowest price for flights from those airlines (e.g., that flights start at $490).

A synthetic row can be displayed in a search results portion of a flight search interface when the currently selected maximum price and duration limits have resulted in the exclusion of flight search results that may be of interest to the user from the displayed flight search results. For example, the synthetic row can be displayed when the currently selected maximum price and duration limits have resulted in the exclusion of the cheapest flight that satisfies the specified dimensions. Additionally, the synthetic row can be displayed when the currently selected maximum price and duration limits have resulted in the exclusion of all flights from a particular airline, even though flights from that airline that satisfy each dimension have been identified. In some implementations, the synthetic row is only displayed when the currently selected maximum price and duration limits have been automatically computed, i.e., have not been adjusted by the user. Alternatively, the synthetic row can be displayed regardless of whether at least one of the limits has been specified by the user.

The user can select the synthetic portion 1010, e.g., with a cursor of an input device or with a touch input. In response, the price and duration limits can be adjusted, e.g., set to sufficiently large numbers so that all of the search results satisfying the dimensions are displayed.

FIG. 11 is an example flight search interface 1100 that includes an add results element 1110. The flight search interface 1100 includes a search query input field 1102, a dimensions portion 1104, and a search results portion 1106. The dimensions portion 1104 includes primary dimensions 1112, and secondary dimensions 1114. The primary dimensions include a maximum price limit 1116 and a maximum duration limit 1118. The maximum price and duration limits have been automatically computed, e.g., based on the values of the primary dimensions and the other secondary dimensions.

The search results portion 1106 includes search results 1120 that satisfy each of the primary dimensions 1112 and each of the secondary dimensions 1114. The search results portion 1106 also includes the add results element 1110 and text indicating that additional flight search results displayed in response to a user selection of the add results element 1110 will exceed at least one of the maximum price limit 1116 and the maximum duration limit 1118. In response to a user selection of the add results element 1110, the maximum price limit and the maximum duration limit can automatically be adjusted so that ten additional results that satisfy each of the primary dimensions and each of the secondary dimensions including the newly computed maximum price and duration limits are displayed. Although a selection of the add results element 1110 results in ten additional search results being displayed, in some implementations, the selection can result in a different number, e.g., five, fifteen, or twenty, of additional results being displayed.

Figure 12:
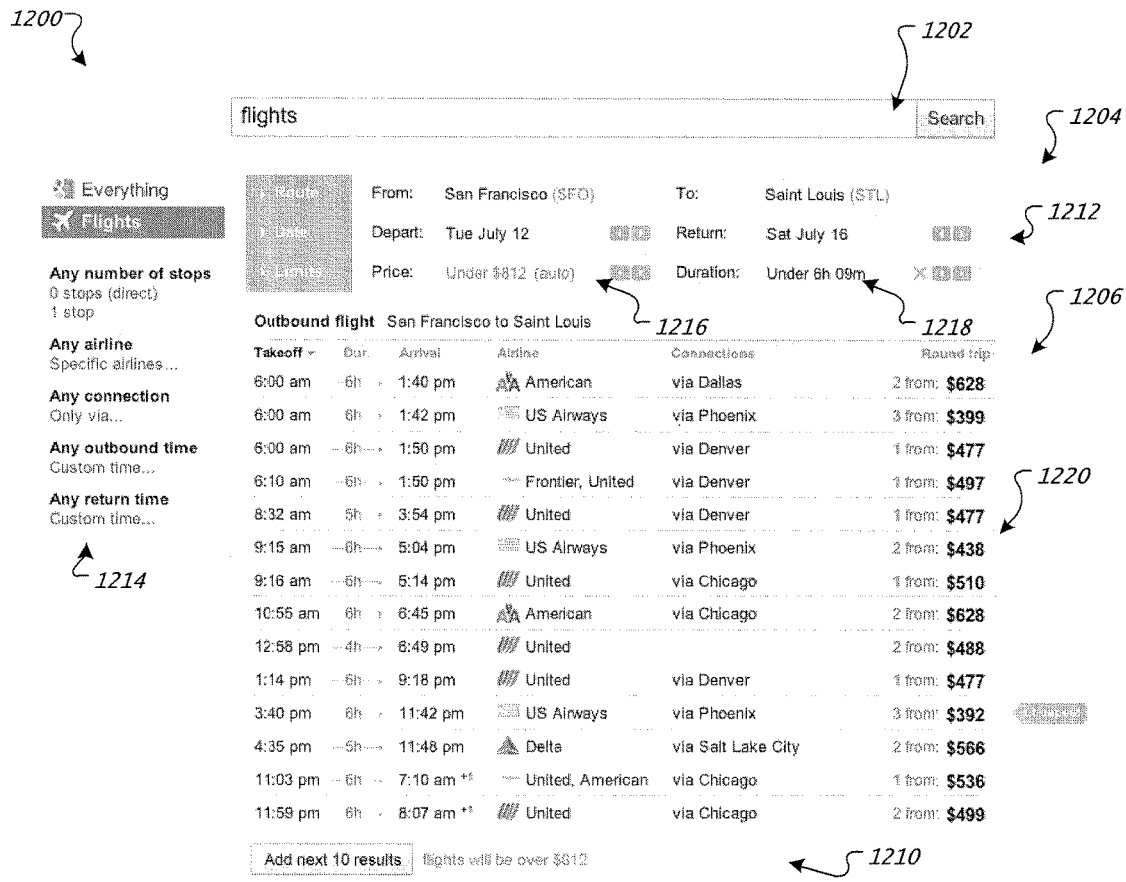
FIG. 12 is an example flight search interface that includes an add results element.

FIG. 12 is an example flight search interface 1200 that includes an add results element 1210. The flight search interface 1200 includes a search query input field 1202, a dimensions portion 1204, and a search results portion 1206. The dimensions portion 1204 includes primary dimensions 1212, and secondary dimensions 1214. The primary dimensions include a maximum price limit 1216 and a maximum duration limit 1218. The maximum price limit 1216 has been automatically computed. However, the maximum duration limit 1218 has been specified by a user. For example, the user may have adjusted an automatically computed value of the duration limit by entering an input into the maximum duration limit field 1218 or by interacting with the arrow indicators associated with the maximum duration limit field 1218.

The search results portion 1206 includes search results 1220 that satisfy each of the primary dimensions 1212 and each of the secondary dimensions 1214. The search results portion 1206 also includes the add results element 1210 and text indicating that additional flight search results displayed in response to a user selection of the add results element 1210 will exceed the maximum price limit 1216. Because the maximum duration limit 1218 has been specified by the user rather than automatically computed, the maximum duration limit 1218 will remain fixed. In response to a user selection of the add results element 1210, the maximum price limit can automatically be adjusted, i.e., increased, to an amount that results in ten additional results that satisfy each of the primary dimensions and each of the secondary dimensions including the newly computed maximum price limit being displayed. Although a selection of the add results element 1210 results in ten additional search results being displayed, in some implementations, the selection can result in a different specified number, e.g., five, fifteen, or twenty, of additional results being displayed. The additional search results can be added, for example, in order of price so that the ten (or other specified number) cheapest search results that satisfy each of the primary and secondary dimensions and are not already displayed are added to the search results 1220.

In some implementations, if both the maximum price limit and the maximum duration limit have been adjusted by the user, no add results element will be displayed, i.e., because both user-adjusted limits are fixed.

FIG. 13 is an example flight search interface 1300 including a cheapest flight link 1310. The flight search interface 1300 includes a search query input field 1302, a dimensions portion 1304, and a search results portion 1306. The dimensions portion 1304 includes primary dimensions 1312, and secondary dimensions 1314. The secondary dimensions include a maximum price limit 1316 and a maximum duration limit 1318. The maximum price and duration limits have been automatically computed.

The search results portion 1306 includes search results 1320 that satisfy each of the primary dimensions 1312 and each of the secondary dimensions 1314. The search results portion 1306 also includes the cheapest flight link 1310 and text indicating that the cheapest flight has a duration that exceeds the maximum duration limit 1318. The cheapest flight link 1310 and the associated text are displayed only when the cheapest flight does not satisfy the maximum duration limit 1318. In some implementations, the cheapest flight link 1310 and the associated text are displayed only when the cheapest flight does not satisfy the maximum duration limit 1318 and the maximum duration limit has been automatically computed rather than specified by a user.

In response to a user input selecting the cheapest flight link 1310, the duration limit is adjusted so that the cheapest flight satisfies the duration limit and is therefore displayed in the search results 1320. In some implementations, the price limit may also be adjusted, e.g., the price limit may be lowered to ensure that a manageable number of search results are displayed after the duration limit is increased.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to search for flights from non-customized search engine interfaces, comprising:
   receiving, by one or more computing devices, an expressive search query in a search interface, wherein the search interface is not customized for flight search inputs from a user computing device and the search interface is configured to accept a search query that is not flight-related;
   determining, by the one or more computing devices, that the received search query is a flights-related query based on context in the search query; and
   in response to determining that the search query is a flights-related query and without further user input, providing, by the one or more computing devices, a flight search interface including a plurality of search dimensions and a plurality of specific flight search results, each dimension associated with an attribute of flight search and each dimension having an associated value, wherein one or more dimension values correspond to values extracted from the search query, wherein each specific flight search result identifies a specific flight responsive to the query, and wherein the plurality of specific flight search results are filtered according to the dimension values.

2. The computer-implemented method of claim 1, wherein one or more of the plurality of dimensions are associated with default values.

3. The computer-implemented method of claim 2, further comprising:
   receiving, by the one or more computing devices, user input adjusting one or more values in the dimensions portion; and
   automatically updating, by the one or more computing devices, the plurality of specific flight search results in response to the user input.

4. The computer-implemented method of claim 1, wherein determining that the received search query is a flights-related query is based on processing the received search query.

5. The computer-implemented method of claim 4, wherein one or more of the values associated with the dimensions are adjustable based on user input.

6. The computer-implemented method of claim 1, wherein determining that the received search query is a flights-related query includes identifying one or more keywords associated with flight queries.

7. The computer-implemented method of claim 1, further comprising providing, by the one or more computing devices, a link to one or more third party booking sites in response to a user selection of one or more specific flight search results.

8. The computer-implemented method of claim 1, wherein the portion includes an interactive map and wherein the user can modify an origin or destination value through a map input.

9. The computer-implemented method of claim 1, wherein the dimensions portion includes a flights scatterplot displaying flights with respect to a pair of dimensions.

10. The computer-implemented method of claim 9, further comprising:
    receiving, by the one or more computing devices, a user input modifying a marker position associated with one or more of the pair of dimensions in the scatterplot; and
    updating, by the one or more computing devices, the plurality of specific flight search results according to flights within the region of the scatterplot demarcated by the user input.

11. The computer-implemented method of claim 1, further comprising:
    receiving, by the one or more computing devices, a user input selecting a particular flight search result; and
    in response to the selection, presenting, by the one or more computing devices, one or more associated return specific flight search results.

12. The computer-implemented method of claim 11, wherein a user selection of a flight search result and a return flight search result identifies a selected itinerary.

13. The method of claim 1, wherein each specific flight search result comprises a flight number.

14. A system comprising data processing apparatus and one or more storage devices storing instructions that, when executed by the data processing apparatus, cause the system to perform operations comprising:
    receiving an expressive search query in a search interface, wherein the search interface is not customized for flight search inputs from a user computing device, and the search interface is configured to accept a search query that is not flight-related;

determining that the received search query is a flights-related query based on context in the search query; and in response to determining that the search query is a flights-related query and without further user input, providing a flight search interface including a plurality of search dimensions and a plurality of specific flight search results, each dimension associated with an attribute of flight search and each dimension having an associated value, wherein one or more dimension values correspond to values extracted from the search query, wherein each specific flight search result identifies a flight responsive to the query, and wherein the plurality of specific flight search results are filtered according to the dimension values.

15. The system of claim 14, wherein one or more of the plurality of dimensions are associated with default values.

16. The system of claim 15, further storing instructions that, when executed by the data processing apparatus, cause the data processing apparatus to perform operations comprising:

receiving user input adjusting one or more values in the dimensions portion; and automatically updating the specific flight search results in response to the user input.

17. The system of claim 14, wherein determining that the received search query is a flights-related query is based on processing the received search query.

18. The system of claim 17, wherein one or more of the values associated with the dimensions are adjustable based on user input.

19. The system of claim 14 wherein:

the dimensions portion includes a flights scatterplot displaying flights with respect to a pair of dimensions; and the system stores instructions that, when executed by the data processing apparatus, cause the data processing apparatus to perform operations comprising:

receiving a user input modifying a marker position associated with one or more of the pair of dimensions in the scatterplot; and updating specific flight search results according to flights within the region of the scatterplot demarcated by the user input.

20. The system of claim 14, wherein each specific flight search result comprises a flight number.

21. A non-transitory computer storage medium encoded with a computer program, the program comprising instructions that, when executed by data processing apparatus, cause the data processing apparatus to perform operations comprising:

receiving an expressive search query in a search interface, wherein the search interface is not customized for flight search inputs from a user computing device and the search interface is configured to accept a search query that is not flight-related;

determining that the received search query is a flights-related query based on context in the search query; and in response to determining that the search query is a flights-related query and without further user input, providing a flight search interface including a plurality of search dimensions and a plurality of specific flight search results, each dimension associated with an attribute of flight search and each dimension having an associated value, wherein one or more dimension values correspond to values extracted from the search query, wherein each specific flight search result identifies a flight responsive to the query, and wherein the plurality of specific flight search results are filtered according to the dimension values.

22. The computer storage medium of claim 21, wherein one or more of the plurality of dimensions are associated with default values.

23. The computer storage medium of claim 22, wherein the operations further comprise:

receiving user input adjusting one or more values in the dimensions portion; and automatically updating the specific flight search results in response to the user input.

24. The computer storage medium of claim 21, wherein determining that the received search query is a flights-related query is based on processing the received search query.

25. The computer storage medium of claim 24, wherein one or more of the values associated with the dimensions is adjustable based on user input.

26. The computer storage medium of claim 24, wherein determining that the received search query is a flights-related query includes identifying one or more keywords associated with flight queries.

27. The computer storage medium of claim 21, the computer-executable program instructions further comprising computer program instructions to provide a notice to the user of the refund.

* * * * *

UNITED STATES PATENT AND TRADEMARK OFFICE
CERTIFICATE OF CORRECTION

PATENT NO. : 9,684,690 B2
APPLICATION NO. : 13/979638
DATED : June 20, 2017
INVENTOR(S) : Marcin Z. Brodziak et al.

Page 1 of 1

It is certified that error appears in the above-identified patent and that said Letters Patent is hereby corrected as shown below:

In the Claims

Column 20, Claim 8, Line 35 should read "--wherein the dimensions portion includes an interactive map and wherein--"

Signed and Sealed this
Eighth Day of August, 2017

Joseph Matal
*Performing the Functions and Duties of the*
*Under Secretary of Commerce for Intellectual Property and*
*Director of the United States Patent and Trademark Office*